United States Patent [19]

Ouellette

[11] Patent Number: 5,706,933
[45] Date of Patent: Jan. 13, 1998

[54] MOVEABLE CONVEYOR GUIDE RAIL

[75] Inventor: Joseph F. Ouellette, Glendale, Mo.

[73] Assignee: Ouellette, Machinery Systems, Inc., Fenton, Mo.

[21] Appl. No.: 667,961

[22] Filed: Jun. 19, 1996

[51] Int. Cl.$^6$ .................................................. B65G 21/20
[52] U.S. Cl. ............................ 198/836.3; 198/836.1
[58] Field of Search ........................ 198/836.1–836.3

[56] References Cited

U.S. PATENT DOCUMENTS

| | | | |
|---|---|---|---|
| 4,216,855 | 8/1980 | Raudat | 198/836.3 X |
| 5,394,979 | 3/1995 | Hall et al. | 198/836.3 |
| 5,547,063 | 8/1996 | Bonnet | 198/836.1 X |
| 5,551,555 | 9/1996 | Gladieux et al. | 198/836.3 |

*Primary Examiner*—James R. Bidwell
*Attorney, Agent, or Firm*—Howell & Haferkamp, L.C.

[57] ABSTRACT

Moveable conveyor guide rails are located on opposite sides of a conveyor which conveys articles, such as beverage bottles. The guide rails are pivotable or otherwise moveable from a first position, where they serve as conventional conveyor guide rails by preventing the articles being conveyed from tipping, rocking, or falling off the sides of the conveyor, to a second position, where the guide rails are concealed by being pivoted or otherwise moved downwardly so that the articles being conveyed on the conveyor can be accessed by a palletizing machine from the sides of the conveyor without obstruction from the guide rails.

17 Claims, 4 Drawing Sheets

MOVEABLE CONVEYOR GUIDE RAIL

BACKGROUND OF THE INVENTION

The present invention pertains to improvements to conveyor guide rails for preventing articles being conveyed on a conveyor from tipping, rocking, or falling off of the conveyor as the articles are conveyed. More particularly, the present invention pertains to conveyor guide rails which can be pivoted from an upwardly angled configuration to a substantially concealed configuration so that the articles being conveyed on the conveyor can be easily accessed from the sides of the conveyor without obstruction from the guide rails.

Many small articles, such as beverage containers, are packaged in pallet load lots. Pallet loads are large stacks of articles or boxes of articles which are held on a flat support or pallet. The pallets may carry bulk items, such as beverage containers, or boxes or cases, each of which contain several items. The pallet and the goods on it can be moved as a unit from manufacture and packaging through distribution and ultimate use of the goods. Articles are often loaded onto pallets or unloaded from pallets manually or automatically. A variety of machines have been devised to load articles onto pallets or unload articles from pallets, because manual handling is slower and more expensive. These machines are known as palletizers or depalletizers in the industry.

Typically, articles to be packaged and/or palletized are transported via conveyors between work stations in a bottle blow molding plant. Belt conveyors are commonly used for transporting articles. The articles being transported stand on the belt conveyor as the conveyor moves the articles in the downstream direction toward their destination. For example, in a high speed beverage bottle blow molding operation, bulk bottles are conveyed on a conventional belt conveyor from one work station to another, and ultimately to a palletizing machine. The bottles stand loosely on the conveyor as the conveyor moves the bottles in the downstream direction toward the palletizing machine. In order to prevent inadvertent tipping, rocking or falling of the bottles from the conveyor, guide rails are commonly used. The guide rails also serve to keep groups of bottles appropriately aligned and positioned so that a palletizing machine can properly engage the bottles for palletizing or packaging them. Typically, the guide rails are positioned on opposite sides of the conveyor and span the length of the conveyor. The guide rails extend upward from the conveying surface for at least a portion of the height of the bottles being conveyed. The guide rails must have a minimum height that is sufficient to prevent the bottles from tipping, rocking, or falling from the conveyor as the bottles are conveyed.

A state of the art palletizing machine comprises a sweeping apparatus that is lowered over a group of bottles standing on a conveyor. The sweeping apparatus has gripper flaps pivotably mounted around its perimeter. The flaps pivot inwardly to grasp the group of bottles prior to moving or sweeping the group of bottles. The flaps engage the sides of the bottles at the perimeter of the group, fixing the group together, and serve to keep the bottles in an upright and straight configuration while they are swept to another location.

In the prior art, the flaps are not permitted to grasp the bottles along their entire vertical length. Rather, the bottom edge of the flaps must be elevated from the conveying surface a distance sufficient to clear the guide rails at the sides of the conveyor as the flaps are pivoted inward to engage the bottles. Consequently, the flaps cannot engage the bottles near their base, but must engage them a distance from the bottom which approximates the height of the guide rails. Typically, the bottle containers have a curved configuration and contoured shapes at their sides. Because the flaps are usually formed as flat planar surfaces they can engage only a portion of the bottles, usually the narrower upper portion with the bottom edges of the flaps being positioned adjacent the contoured sides of the bottles, the bottoms of the bottles are permitted to skew outward as the flaps grasp the upper portions of the bottles. Once the group of bottles has been swept or moved to a pallet and the flaps are relaxed to release the bottles, the disarranged positions of the bottles is often exacerbated by tipping or rocking of the bottles which results from their skewed orientation.

SUMMARY OF THE INVENTION

The present invention comprises conveyor guide rails located on opposite sides of a conveyor which keep articles, such as blow molded bottles, being conveyed on the conveyor from tipping, rocking, or falling off of the conveyor, but which can be moved away from the bottles so that they can be accessed from the sides of the conveyor, such as by a palletizing machine, without obstruction from the guide rails.

The moveable conveyor guide rails of the present invention can be used in blow molded bottle packaging and palletizing operations. For example, the present invention is used in a high speed beverage bottle blow molding operation where bulk bottles are conveyed on a conventional belt conveyor from one work station to another, and ultimately to a palletizing machine. The bottles stand loosely on the conveyor as the conveyor moves the bottles in the downstream direction toward the palletizing machine. The guide rails, positioned on opposite sides of the conveyor and spanning the length of the conveyor, help to prevent inadvertent tipping, rocking or falling of the bottles from the conveyor as the bottles are conveyed. The guide rails also serve to keep groups of bottles appropriately aligned and positioned so that the group is in the proper arrangement when engaged by a palletizing machine. The guide rails of the invention are mounted on each side of the conveyor surface for movement relative to the conveyor surface. This moveable mounting allows each guide rail to be fixed in two positions. First, each guide rail can be positioned so that it serves as a conventional guide rail. In this position, the guide rail is angled upward from and toward the center of the conveyor surface so that the inside edge of the guide rail is located a vertical distance above the conveyor surface that is sufficient to prevent the bottles from tipping, rocking, or falling from the conveyor as the bottles are conveyed. Second, each guide rail can be moved, and in the preferred embodiment each is rotated about the pivot axis downward towards the surface of the conveyor so that the inside edge of the guide rail is resting on or just above the conveyor surface. In this position, the guide rail is in a substantially horizontal configuration, and is effectively concealed, thereby allowing unobstructed access to substantially the entire vertical length of the bottles from the sides of the conveyor. Although pivoting movement of the guide rails is preferred, it should be understood that they could also be controlled to translate vertically or horizontally away from the conveyor to provide access to a mechanism that picks up or sweeps the group of bottles from the conveyor.

Each guide rail is connected to a cylinder actuator which determines the position of the guide rail. The cylinder actuator includes a first end which reciprocates axially in relation to a second end so that the cylinder actuator has a compressed configuration and an extended configuration. The first end of the cylinder actuator is pivotably connected to the guide rail and the second end of the cylinder actuator is pivotably mounted to a fixed surface. When the cylinder actuator is in its extended configuration, the guide rail is rotated about the pivot to its upward orientation. When the cylinder actuator is in its compressed configuration, the guide rail is rotated about the pivot to its concealed orientation.

The moveable conveyor guide rails of the present invention can be used with a palletizing machine which comprises a sweeping or lifting apparatus that is lowered over a group of bottles standing on the conveyor. The sweeping or lifting apparatus has flaps pivotably mounted around its perimeter which pivot inwardly to grasp around the outside perimeter of a group of bottles standing on the conveying surface prior to moving or sweeping the group of bottles. The flaps engage the sides of the bottles at the perimeter of the group, fixing the group together, and serve to keep the bottles in an upright and straight configuration while they are swept or lifted to another location.

This invention is a significant improvement over the prior art in that the bottom edge of the flaps do not have to be elevated a distance sufficient to clear the prior art guide rails as the flaps are pivoted inward to engage the bottles. The guide rails of the invention are pivoted or otherwise moved downward to their concealed position as the flaps are pivoted inward to engage the group of bottles. Because the guide rails are effectively concealed in this position, the group of bottles can be accessed from the sides of the conveyor by the flaps without obstruction from the guide rails. Thus, the flaps are permitted to grasp the group of bottles closer to the bottom of the bottles. This prevents the bottoms of the bottles from skewing outward as the flaps grasp the bottles. Because the flaps are able to engage the group of bottles along substantially their entire vertical length, even bottles with a curved or contoured side configuration that tend to skew easier than bottles with straight sidewalls are kept in a proper orientation. Moreover, the bottles are less prone to tipping or rocking as the flaps are relaxed to release the bottles since they are already in a straight orientation. As such, the present invention satisfies a long felt need by meeting the objectives of the prior art and more, without the problems encountered with the prior art.

While the principal advantages and features of the present invention have been described above, a more complete and thorough understanding and appreciation for the invention may be attained by referring to the drawings and description of the preferred embodiment which follow.

BRIEF DESCRIPTION OF THE DRAWINGS

Further objects and features of the present invention are revealed in the following detailed description of the preferred embodiment of the invention and in the drawing figures wherein.

DESCRIPTION OF THE PREFERRED EMBODIMENT

Figure 1:
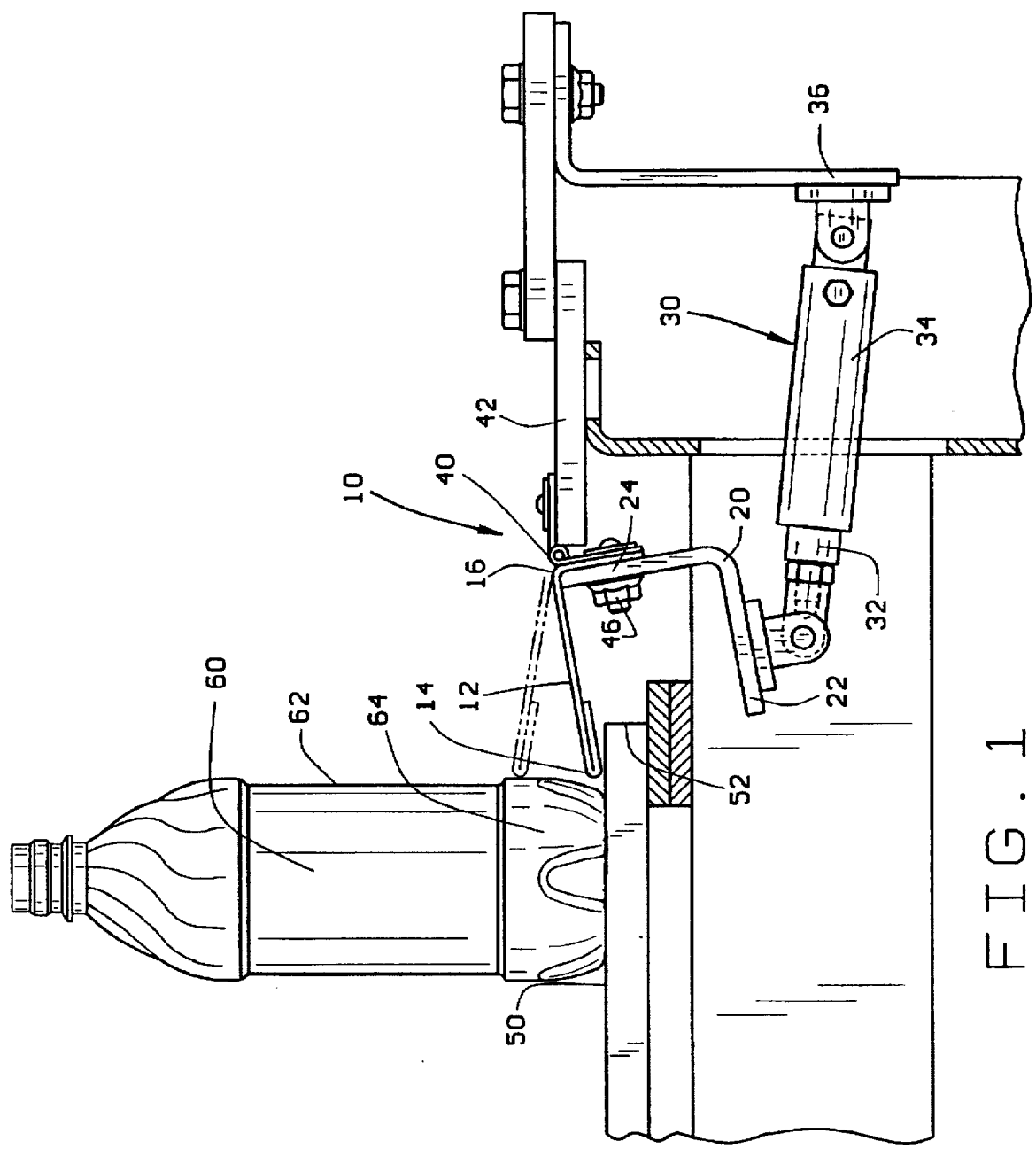
FIG. 1 is a partial end view of the pivoting guide rail shown installed with a conveyor system.
Figure 5:
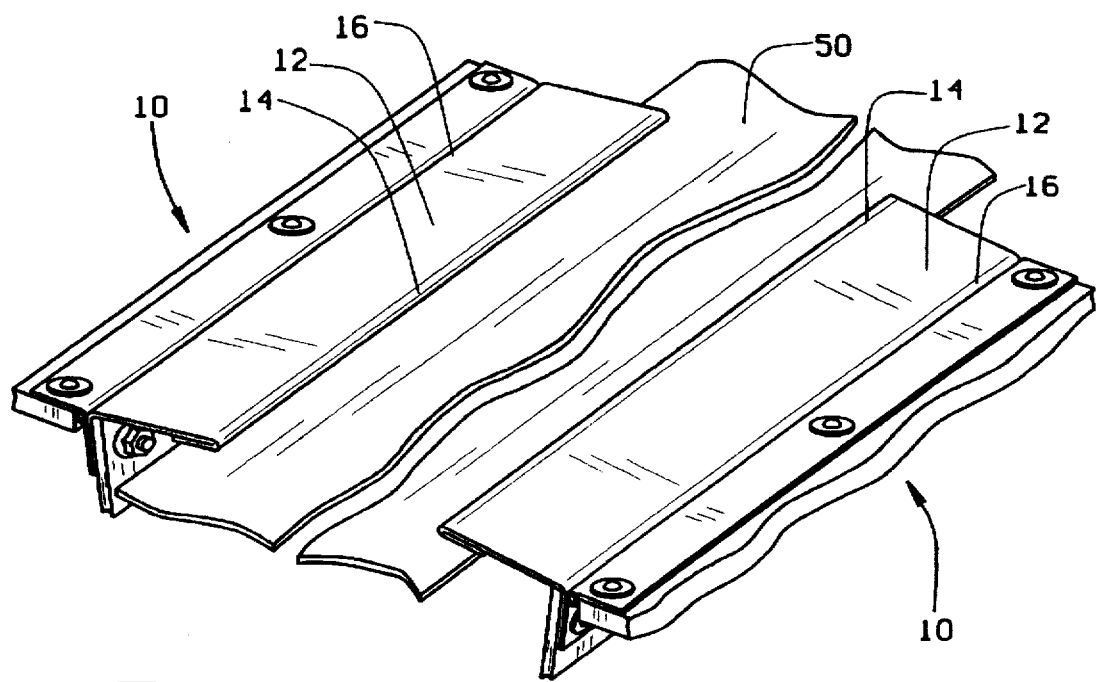
FIG. 5 is an isometric view of a pair of pivoting guide rails.

Referring in more detail to FIG. 1, the moveable conveyor guide rail apparatus of the present invention is shown generally as 10. The present invention comprises at least one moveable conveyor guide rail apparatus 10, but preferably comprises a pair of such moveable conveyor guide rails laterally spaced on opposite sides of a conveying surface 50, as shown in FIG. 5.

In the preferred embodiment, each moveable conveyor guide rail apparatus 10 further comprises an elongated rail 12 having a substantially planar configuration, a cylinder actuator 30, and an L-shaped bracket 20 connecting the rail 12 to the cylinder actuator 30. A pair of the rails 12 are laterally spaced on opposite sides 52, 54 of the conveying surface 50 and extend along a portion of the longitudinal length of the conveying surface 50 (See FIG. 5). As shown in FIG. 1, each rail 12 has an inner edge 14 facing the conveying surface 50 and an outer edge 16 facing away from the conveying surface 50. The inner edge 14 is configured for engaging articles or blow molded bottles 60 being conveyed along the conveying surface 50. In the preferred embodiment, the outer edge 16 is pivotably attached to a fixed surface 42 of the conveyor frame by a hinge 40 enabling the inner edge 14 of the rail 12 to pivot about the hinge 40. However, it should be understood that with minor modifications, the moveable guide rails could be mounted adjacent the conveyor for relative vertical or horizontal translatory movement away from the conveyor, instead of the pivoting movement described.

The L-shaped bracket 20 has a first leg 24 fixedly connected to the rail 12 by a fastener 46 and a second leg 22 pivotably connected to the cylinder actuator 30.

The cylinder actuator 30 includes a rod at its first end 32 which reciprocates axially in relation to a cylinder at its second end 34 between a retracted configuration and an extended configuration of the cylinder actuator 30. The first end 32 of the cylinder actuator 30 is pivotably connected to the second leg 22 of the L-shaped bracket 20. The second end 34 of the cylinder actuator 30 is pivotably mounted to a fixed surface 36 of the conveyor frame.

Figure 3A:
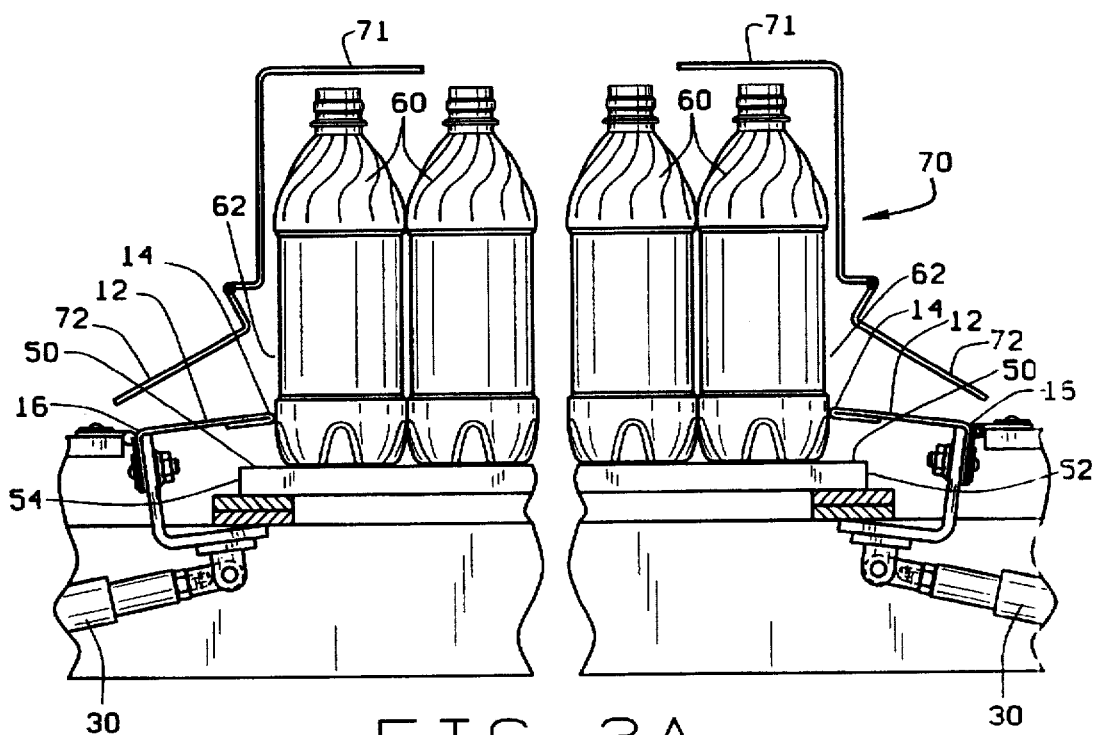
FIG. 3A is an end view of a pair of pivoting guide rails shown with a conveyor system and a state of the art palletizing machine with its gripper flaps in an open configuration.
Figure 3B:
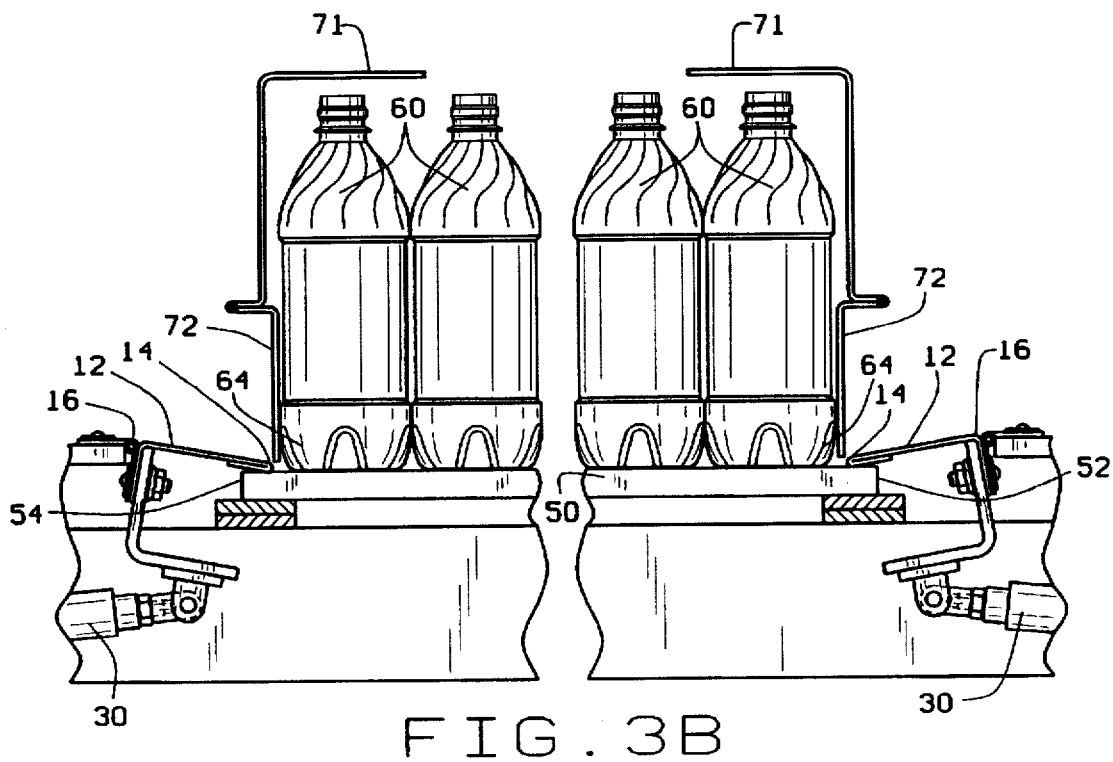
FIG. 3B is an end view of a pair of pivoting guide rails shown with a conveyor system and a state of the art palletizing machine with its gripper flaps in a closed configuration.

The hinge 40 allows the guide rail 12 to be pivoted between an upward orientation and a concealed orientation. In the preferred embodiment, the cylinder actuator is located below the guide rail. As shown in FIG. 3A, when the cylinder actuator 30 is in its extended configuration, the guide rail 12 is rotated about the hinge 40 to its upward orientation. As shown in FIG. 3B, when the cylinder actuator 30 is in its retracted configuration, the guide rail 12 is rotated about the hinge 40 to its concealed orientation. Although the cylinder actuator is positioned below the guide rail in the preferred embodiment, it is to be understood that a cylinder actuator, or other means for positioning the guide rails, can be located elsewhere in relation to the guide rails.

When the guide rails 12 are in their upward orientation, they serve as conventional guide rails. In this position, each guide rail 12 is angled upward from and toward the center of the conveying surface 50 so that the inner edge 14 of the guide rail 12 is located a vertical distance above the conveying surface 50 that is sufficient to prevent the articles 60 being conveyed from tipping, rocking, or falling from the conveying surface 50. Each guide rail 12 can be pivoted about the hinge 40 downward towards the conveying surface 50 so that the inner edge 14 of the guide rail 12 is resting on or juxtaposed above the conveying surface 50. In this position, the guide rail 12 is effectively concealed allowing unobstructed access to the articles 60 being conveyed from the sides 52, 54 of the conveying surface 50.

The moveable conveyor guide rails 10 are used in packaging and palletizing operations. For example, the articles 60 are conveyed on a conveying surface 50 comprising a conventional belt conveyor from one work station to another, and ultimately to a palletizing machine or other device (not shown in the FIGS.). The articles 60 stand loosely on the conveying surface 50 as they are conveyed in a downstream direction toward the palletizing machine. In their upward orientation, a pair of guide rails 12, positioned on opposite sides 52, 54 of the conveying surface 50, help to prevent inadvertent tipping, rocking or falling of the articles 60 from the conveying surface 50 as the articles 60 are conveyed. The guide rails 12 also serve to keep groups of conveyed articles 60 properly aligned and positioned so that the group is in the appropriate arrangement when engaged by the palletizing machine.

The conveyor includes a dead plate that extends between the guide rails at the end and in the plane of the conveying surface just downstream of the palletizing machine. The dead plate has a plurality of holes in its top surface and a plurality of fingers are controlled to selectively project upwardly through the holes and across the path of the conveying surface. These plurality of fingers stop the movement of the articles as the conveyor surface continues to move up to the dead plate, thereby causing a group of articles to collect in front of the fingers and between the guide rails just below the palletizing machine lifting or sweeping mechanism.

Referring now to FIGS. 3A and 3B, the moveable conveyor guide rails 10 are used with a palletizing machine which comprises a sweeping or lifting apparatus 70 having four pivoting flaps arranged in a rectangular configuration on a base 71 of the apparatus. In FIGS. 3A and 3B, only the pair of laterally spaced flaps 72 are shown. It should be understood that the palletizing apparatus also includes a pair of longitudinally spaced flaps that are not shown in the drawings. The palletizing apparatus is next caused to be lowered over a group of articles 60 collected by the dead plate fingers on the conveying surface 50 beneath the palletizing machine. As the base is lowered, the flaps 72 simultaneously pivot inwardly to grasp the group of articles 60 collected by engaging the articles 60 on the perimeter of the group prior to lifting or sweeping the group to another location. The flaps 72 engage the sides 62 of the articles 60 that are on the perimeter of the group, thereby fixing the group together, and serving to keep the articles 60 in an upright and straight configuration while they are swept or lifted to another location.

Figure 2A:
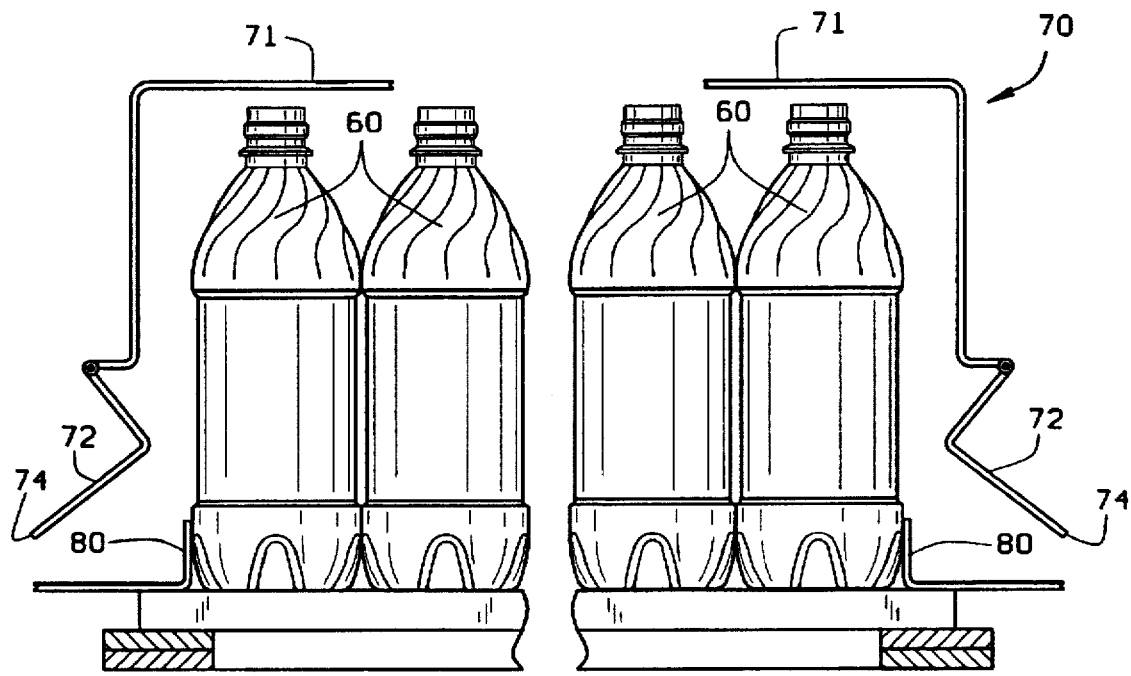
FIG. 2A is an end view of a pair of prior art guide rails shown with a conveyor system and a state of the art palletizing machine with its gripper flaps in an open configuration.
Figure 2B:
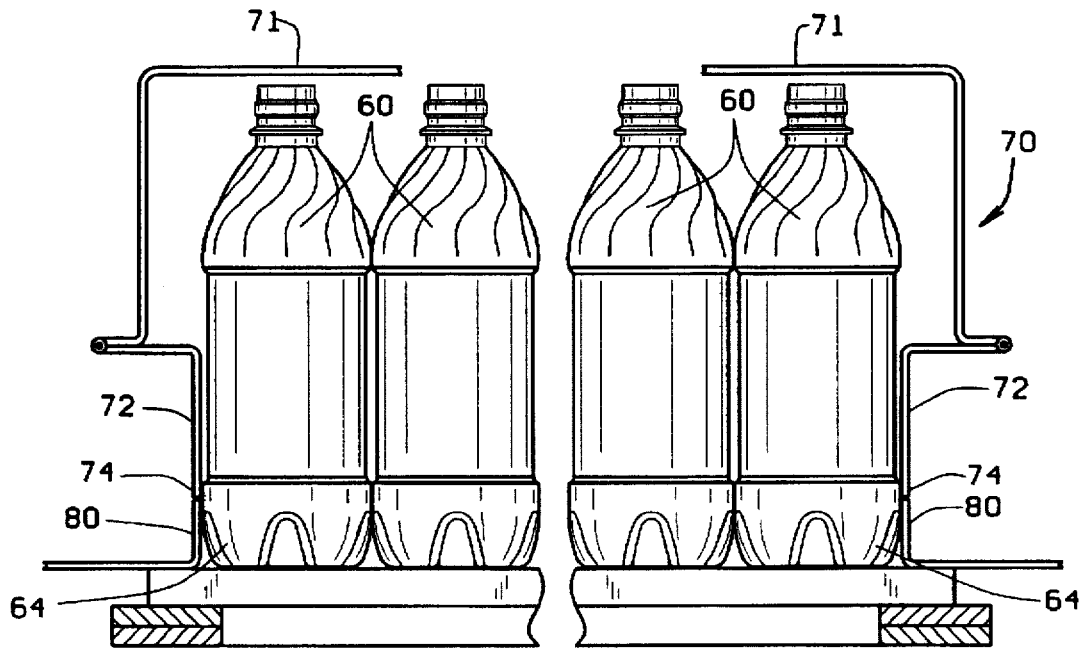
FIG. 2B is an end view of a pair of prior art guide rails shown with a conveyor system and a state of the art palletizing machine with its gripper flaps in a closed configuration.
Figure 4:
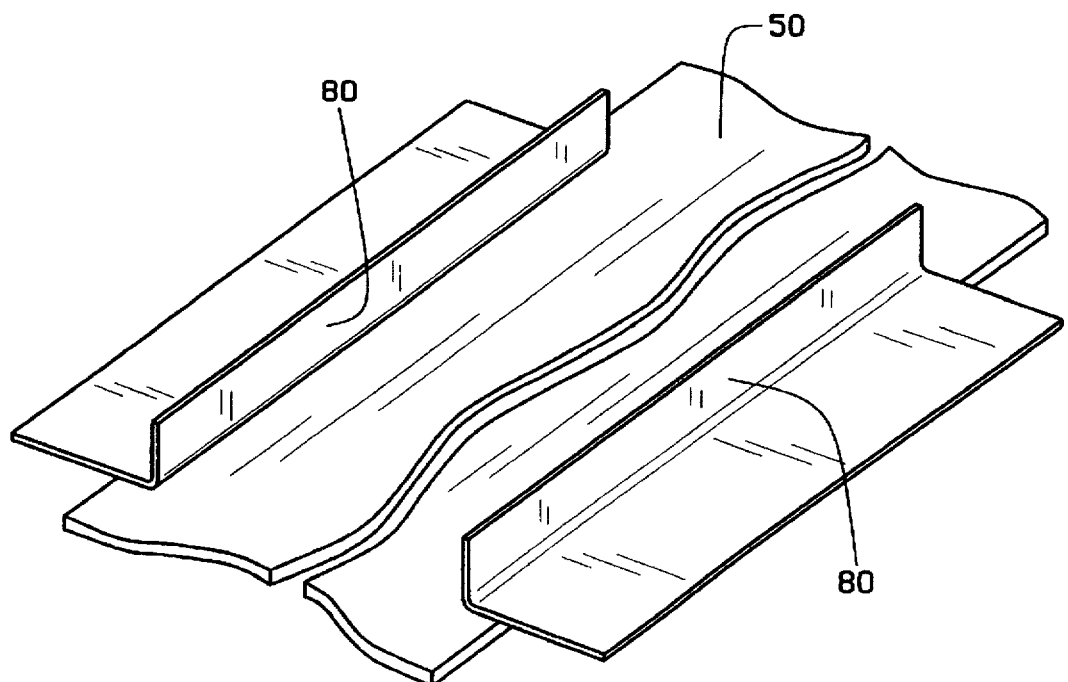
FIG. 4 is an isometric view of a pair of prior art conveyor guide rails.

The moveable conveyor guide rails 10 can be used, for example, in a high speed blow molded bottle operation. In a bottle conveying system that uses conventional prior art conveyor guide rails 80, as shown in FIGS. 2A, 2B, and 4, the guide rails 80 extend upward from the conveying surface 50 a distance equal to at least a portion of the height of the bottles 60 being conveyed. The guide rails 80 must have a minimum height that is sufficient to prevent the bottles 60 from tipping, rocking, or falling from the conveying surface 50 as the bottles 60 are conveyed. Because the prior art guide rails 80 are not pivotable or otherwise moveable to a concealed position, the bottom edge 74 of the flaps 72 must be elevated from the conveyor surface 50 a sufficient distance to clear the prior art guide rails 80 as the flaps 72 are pivoted inward to engage the bottles 60. Consequently, the flaps 72 cannot engage the bottles 60 near the base 64 of the bottles 60, but must engage the bottles 60 a vertical distance from their base 64 which approximates the height of the guide rails 80. Typically, the bottles 60 have a configuration with contoured sides, but have the same diameter at their top and bottom portions at opposite ends of the contoured sides or have their largest diameter at the bottom portions below the contoured sides. As seen in the drawings, the contoured sides have smaller diameters than the top and bottom portions of the bottles. Because the flaps 72 of prior art lifting or sweeping mechanisms can engage only a portion of the bottles 60, usually the top portion, in order to clear the prior art guide rails, only the top bottle portion of larger diameter is engaged by the flaps and the bottoms 64 of the bottles 60 are permitted to skew outward as the flaps 72 grasp the top portions of the bottles 60. Once the group of bottles 60 has been swept or moved to a pallet or other surface and the flaps 72 are relaxed, the disarranged positions of the bottles 60 is often exacerbated by tipping or rocking of the bottles 60 which results from their skewed orientation when they are released by the flaps of the palletizing machine.

The present invention allows the flaps 72 to engage the bottles 60 at or near the conveying surface 50 so that the flaps can engage both the top and bottom larger diameter portions of the bottles and thereby hold the group of bottles without their skewing. When the guide rails 12 are in their concealed orientation, each rail 12 is in a downwardly angled position with the inner edge 14 of the rail 12 resting on or juxtaposed just above the conveying surface 50.

Because the guide rails 12 are pivoted downward to a virtually concealed position, it is not necessary for the bottom edge 74 of the flaps 72 to be elevated from the conveying surface 50 in order to clear the guide rails 12 as the flaps 72 are pivoted inward to engage the group of bottles 60. The guide rails 12 are pivoted downward to their concealed position as the palletizing apparatus base 71 simultaneously moves downward and the flaps 72 are pivoted inward to engage the group of bottles 60. Because the inner edge 14 of the guide rails 12 are positioned at the level of the conveying surface 50, the group of bottles 60 can be accessed from the sides 52, 54 of the conveying surface 50 by the flaps 72 without obstruction from the guide rails 12. Thus, the flaps 72 are permitted to grasp the group of bottles 60, engaging the sides 62 of the bottles 60 on the perimeter of the group at both the top and bottom larger diameter portions of the bottles. As a result, even bottles with a curved configuration or contoured shape at their middle are kept from skewing or becoming otherwise displaced. Moreover, the bottles 60 are less prone to tipping or rocking as the flaps 72 are relaxed since they are already in a straight orientation.

While the present invention has been described by reference to a specific embodiment, it should be understood that modifications and variations of the invention may be constructed without departing from the scope of the invention defined in the following claims.

What is claimed is:

1. A moveable conveyor guide rail, for use with a conveyor having a substantially planar conveying surface with a longitudinal length and a lateral width, the conveyor being configured to convey articles having a height on the conveying surface in a downstream direction along the longitudinal length of the conveyor, said moveable conveyor guide rail comprising:

an elongated guide rail, said guide rail being positioned at a side of the conveying surface and having a length extending longitudinally along the side of the conveyor for at least a portion of the longitudinal length of the conveyor, said guide rail having an inner edge facing the conveying surface and an outer edge facing away from conveying surface, the inner edge being configured to engage articles being conveyed by the conveyor and the outer edge being pivotably attached to a fixed surface for movement of the guide rail relative thereto, the fixed surface being located at the side of the conveyor so that the inner edge of said guide rail can be moved to a position relative to the conveying surface where it does not obstruct access to the conveying surface from either side of the conveying surface.

2. The moveable conveyor guide rail of claim 1 wherein:
said guide rail is attached to the fixed surface for pivoting movement about a pivot axis between an upward orientation and a concealed orientation of the guide rail relative to the conveying surface.

3. The moveable conveyor guide rail of claim 2 wherein:
in the upward orientation, the inner edge of said guide rail is positioned above the conveying surface and is configured to engage the articles, thereby serving to guide travel of the articles as they are conveyed.

4. The moveable conveyor guide rail of claim 2 wherein:
in the concealed orientation, the inner edge of said guide rail is juxtaposed adjacent the conveying surface, thereby allowing unobstructed access from the side of the conveyor to the articles being conveyed.

5. A moveable conveyor guide rail, for use with a conveyor having a substantially planar conveying surface with a longitudinal length and a lateral width, the conveyor being configured to convey articles having a height on the conveying surface in a downstream direction along the longitudinal length of the conveyor, said moveable conveyor guide rail comprising:

an elongated guide rail, said guide rail being positioned at a side of the conveying surface and having a length extending longitudinally along the side of the conveyor for at least a portion of the longitudinal length of the conveyor, said guide rail having an inner edge facing the conveying surface and an outer edge facing away from conveying surface, the inner edge being configured to engage articles being conveyed by the conveyor and the outer edge being operatively attached to a fixed surface for movement of the guide rail relative thereto, the fixed surface being located at the side of the conveyor so that the inner edge of said guide rail can be moved to a position relative to the conveying surface where it does not obstruct access to the conveying surface from either side of the conveying surface;

a cylinder actuator having a first end which reciprocates axially in relation to a second end between a retracted configuration of the cylinder and an extended configuration of the cylinder, the first end being connected to said guide rail and the second end being mounted to the fixed surface.

6. The moveable conveyor guide rail of claim 5 wherein:
said guide rail outer edge is pivotally attached to the fixed surface at a pivot axis and pivots about the pivot axis between an upward orientation and a concealed orientation in response to the cylinder actuator moving to its extended configuration and its retracted configuration.

7. The moveable conveyor guide rail of claim 6 wherein:
in the upward orientation, the inner edge of said guide rail is located a distance above the conveying surface and above a portion of the height of the articles being conveyed, the inner edge being configured to engage the articles, thereby serving to guide the travel of the articles as they are conveyed.

8. The moveable conveyor guide rail of claim 6 wherein:
in the concealed orientation, the inner edge of said guide rail is located adjacent the conveying surface, thereby allowing unobstructed access from the side of the conveyor to the articles being conveyed.

9. A moveable conveyor guide rail, for use with an article conveyor and an article removing apparatus, the conveyor having a substantially planar conveying surface with a longitudinal length and a lateral width, the conveyor being configured to convey articles having a height on the conveying surface in a downstream direction along the longitudinal length of the conveyor, and wherein the removing apparatus includes at least a pair of moveable flaps positioned over the conveying surface at a height sufficient to allow the articles being conveyed on the conveying surface to pass beneath the moveable flaps, the flaps being disposed in initial positions away from the articles being conveyed, and the flaps being configured to move inwardly toward the articles being conveyed on the conveying surface to engage and remove the articles from the conveyor, said moveable conveyor guide rail comprising:

an elongated guide rail, said guide rail being positioned at a side of the conveying surface and having a length extending longitudinally along the side of the conveyor for at least a portion of the longitudinal length of the conveyor, said guide rail having an inner face facing the conveying surface and an outer face facing away from conveying surface, the inner face being configured to engage articles being conveyed by the conveyor and the outer face being pivotably attached to a fixed surface located at the side of the conveyor so that the inner face of said guide rail can be pivoted about a fixed pivot axis that is substantially parallel to the downstream direction of the conveyor;

a bracket having a first leg and a second leg, the first leg being fixedly connected to said guide rail; and a cylinder actuator further comprising a closed cylinder and a tight-fitting piston positioned within the closed cylinder, the piston being configured to reciprocate axially within the closed cylinder so that said cylinder actuator has a retracted configuration and an extended configuration, said cylinder actuator having a first end pivotably attached to the second leg of said bracket and a second end pivotably mounted to a fixed surface.

10. The moveable conveyor guide rail of claim 9 wherein:
said guide rail pivots about the pivot axis between an upward orientation and a concealed orientation.

11. The moveable conveyor guide rail of claim 10 wherein:
in the upward orientation, the inner face of said guide rail is positioned a vertical distance above the conveying surface that is equal to a portion of the height of the articles being conveyed, the inner face engaging the sides of the articles, thereby maintaining the downstream direction of travel of the articles as they are conveyed.

12. The moveable conveyor guide rail of claim 10 wherein:

in the concealed orientation, the inner face of said guide rail is located adjacent the conveying surface so that said guide rail is substantially adjacent a plane of the conveying surface, thereby allowing unobstructed access from opposite sides of the conveyor to the articles being conveyed.

13. The moveable conveyor guide rail of claim 10 wherein:

said guide rail pivots about the pivot axis between the upward and concealed orientations in response to the cylinder actuator moving between its extended and retracted configurations.

14. The moveable conveyor guide rail of claim 13 wherein:

said guide rail pivots about the pivot axis to the upward orientation when said cylinder actuator extends to the extended configuration.

15. The moveable conveyor guide rail of claim 13 wherein:

said guide rail pivots about the pivot axis to the concealed orientation when said cylinder actuator retracts to the retracted configuration.

16. The moveable conveyor guide rail of claim 9 wherein:

when the guide rail is in the concealed orientation, it provides access for the flaps to be moved inwardly from the side of the conveyor to engage the articles being conveyed.

17. The moveable conveyor guide rail of claim 16 wherein:

the flaps have interior surfaces which engage the articles adjacent the conveying surface when the flaps are moved inwardly from the sides of the conveyor so that the flaps engage the articles along substantially the entire vertical heights of the articles.

* * * * *